United States Patent [19]

Smiley

[11] Patent Number: 5,717,801
[45] Date of Patent: Feb. 10, 1998

[54] DEVICE FOR CONNECTING OPTICAL FIBER ENDS HELD BY DIFFERENT TYPES OF CONNECTOR PLUGS

[75] Inventor: John Omar Smiley, Ottawa, Canada

[73] Assignee: JDS Fitel Inc., Nepean, Canada

[21] Appl. No.: 741,388

[22] Filed: Oct. 29, 1996

[51] Int. Cl.$^6$ ..................................................... G02B 6/36
[52] U.S. Cl. .............................................. 385/60; 385/25
[58] Field of Search ........................... 385/60, 66, 67, 385/25, 26

[56] References Cited

U.S. PATENT DOCUMENTS

| | | | |
|---|---|---|---|
| 4,512,627 | 4/1985 | Archer et al. | 385/25 |
| 4,725,116 | 2/1988 | Spencer et al. | 285/26 |
| 5,140,289 | 8/1992 | Andrieu et al. | 385/26 |

*Primary Examiner*—John Ngo
*Attorney, Agent, or Firm*—Neil Teitelbaum & Associates

[57] ABSTRACT

A device for connecting a first optical fiber end held by a first connector plug selectively to second or third optical fiber ends held by different types of connector plugs, in which each different type of plug has an associated connector socket, these sockets each including a non-circular connector flange and each having a ferrule alignment sleeve held by a retainer bushing projecting outwardly from the connector flange, the alignment sleeves being of the type suitable for receiving cylindrical ferrules attached to each fiber end. The device comprises a fixed part having an aperture extending between its inner and outer surfaces, and having a connector adapter projecting from the inner surface and suitable for receiving the first connector plug, and having a radially extending outer surface portion accessible from the outer surface and surrounding a recess suitable for receiving the retainer bushing of another connector plug. A retainer is rotatably mounted on the fixed part co-axially with the adapter and has opposed flange portions spaced from the outer surface portion, which flange portions define a non-circular opening such that opposite sides of one of the non-circular connector flanges can pass between said flange portions when aligned therewith to bring the alignment sleeve retainer bushing into the adapter recess, and such that opposite corners of the connector flange can be retained by the flange portions upon rotation of the retaining means into a locked position. The device is useful for mounting on the outside of a testing instrument which needs to be connectible to optical fibers having different connector plugs.

8 Claims, 4 Drawing Sheets

DEVICE FOR CONNECTING OPTICAL FIBER ENDS HELD BY DIFFERENT TYPES OF CONNECTOR PLUGS

BACKGROUND OF THE INVENTION

1. Field of the Invention

The present invention relates to detachable connectors for optical fibers, of the type in which each fiber end is provided with a cylindrical ferrule, the ferrules being held in alignment by an alignment sleeve.

2. Prior Art

It is common practice to temporarily connect two optical fibers end-to-end by connecting devices of many different kinds, including those of the type having an alignment sleeve which is an interference fit on outer end portions of cylindrical ferrules which surround each of the fiber ends. By such means the fiber ends can be aligned accurately enough that light signals can pass between the fibers without undue loss, and without requiring any lenses. Such devices include a central socket part which holds the alignment sleeve, and plugs holding end portions of the ferrules, the plugs firing onto opposite ends of the socket part. These plugs themselves are often referred to as "connectors", although it is believed less confusing to use the separate terms "plugs" and "sockets".

It is also common that the fiber and ferrule ends be angled slightly from the perpendicular, say at 8E from the perpendicular; the connecting devices for such fibers must also rotationally align the fibers so that the fiber and ferrule ends are parallel.

Various incompatible designs of connectors are in common use. For example, FC type connectors have plugs which have a nut, i.e. an internally threaded cylinder, engaging an externally threaded sleeve on a cylindrical socket part. SC type connectors, on the other hand, have a plug with a rectangular cross-section which is a push fit into a rectangular housing or receptacle of the socket part, and is held in place by spring latches. ST type connectors have a bayonet type connection.

In some connectors the socket part has, at the end opposite the plug, a square sided flange which is joined back-to-back to a similar socket part. It is also known to provide a hybrid type connector in which a socket suitable for one kind of plug is connected by such flanges to a different type of socket. Such a hybrid type of connector is shown in FIGS. 1 and 2. Here, a first ranged FC type connector socket A with a threaded sleeve 20 has its flange 10a secured to the flange 12 of a SC type connector socket B by small fasteners. The connector socket A receives FC type screw connector plug 14, which includes a nut 14a, a cylindrical bushing 14b which fits into the sleeve, and a ferrule F1, while connector socket B has a rectangular receptacle 15 which receives SC type plug 16 as a push fit, retained by latches. Details of this construction are given below.

The hybrid connector shown in FIGS. 1 and 2 is suitable, for example, for connecting an instrument having internal FC type connector plugs to external fibers having SC connector plugs. However, such external plugs must be of one type. It is not practical for users to disassemble the two flanges of such a hybrid connector to allow use of a different socket.

Another limitation of the connector shown in FIGS. 1 and 2 is that if it is required to clean the ferrule of the internal fiber, the internal connector plug must be disconnected from the inside of the instrument panel, giving the possibility of damage by bending of the fiber.

Also known are ranged connectors which are demountable, and in which the fixed portion of the connector is of complex molded form with cams and springs and having a recess which can receive a square flange which is twisted and snapped into place. This construction is fragile and therefore not appropriate for field instruments. There is also the possibility that the twisting action will damage the angled ends of the ferrules.

Known practical connectors which allow different types of external connector to be attached to the outside of an instrument are those made by Diamond S.A., of Switzerland, and Hewlett Packard of the U.S.A. These are screw type connectors, which are time consuming and sometimes difficult to connect. They are long, and when projecting from an instrument they are subject to breakage. They can receive only one kind of internal connector plug. Another drawback of these connectors is that it is not possible to view the mating sleeves and ferrules when these are coming together, since these parts are then obscured by surrounding sleeve parts.

The present invention overcomes these problems by providing a device which receives a first type of connector plug of an internal optical fiber at a first, inner end, and which has an outer end which can readily receive connector sockets of different types. The invention is particularly useful in instruments intended to be attached to different optical fibers for testing circuits, since it allows such an instrument to be used with different types of plugs such as FC, SC, ST, and other types of connector plug. In such instruments the invention has the following advantages over the prior art:

1. It provides a connecting device which can be coupled quickly to connector plugs of different type;

2. It provides a device which projects only a short distance from a panel, saving space in some circumstances, and making it less subject to damage than long screw-type connectors;

3. It provides a device which can be made inexpensively, compared for example, to the "Diamond" construction;

4. It allows the ferrule and mating sleeve to be observed while the connection is being made, which assists orientation of the parts;

5. It allows the inner ferrule to be accessed from outside the instrument for cleaning;

6. It allows many available types of connector plug to be used for the internal fiber;

7. It prevents any relative rotation between the two fibers while a connection is being made.

SUMMARY OF THE INVENTION

The present invention provides a device for connecting a first optical fiber end held by a first connector plug selectively to second or third optical fiber ends held by different types of connector plugs, e.g. FC, SC, ST, or other type of connector plug, each latter plug being associated with an appropriate type of connector socket, the sockets each including a non-circular, e.g. square, connector flange, and each having a ferrule alignment sleeve held by a retainer bushing projecting outwardly from the connector flange, the alignment sleeve being suitable for receiving cylindrical ferrules attached to each fiber end.

In accordance with the invention, the device comprises:

a fixed part having an aperture extending between its inner and outer surfaces, and having a connector adapter projecting from the inner surface and suitable for receiving the first connector plug, and having a radially extending outer surface portion accessible from said outer surface and surrounding a recess suitable for receiving the retainer bushing, retaining means rotatably mounted on the fixed part co-axially with the adapter and having opposed inwardly projecting flange portions spaced from the outer surface portion, which flange portions define a non-circular opening such that opposite sides of one of the non-circular connector flanges can pass between the flange portions when aligned therewith to bring the alignment sleeve retainer bushing into the adapter recess, and such that opposite corners of the connector flange can be retained by the flange portions upon rotation of the retaining means into a locked position with the connector flange being held against said radially extending outer surface portion; and means tending to hold the retaining means in the locked position relative to the base member.

The arrangement is such that any of the appropriate types of connector socket can be connected to the device by inserting its connector flange through the non-circular opening and causing relative rotation between the retaining means and the fixed part through a predetermined angle to secure the flange to the adapter.

The connector adapter may have a flange which overlaps the sides of the aperture on the outer side of the fixed part and which provides the radially extending surface portion for receiving the connector flange. The retaining means may be a collar having a cylindrical wall with the opposed flange portions projecting inwardly from its outer end and having an inwardly directed flange at its inner end which latter flange is trapped between the fixed part outer surface and the flange of the adapter.

The device may also have spring means urging the inwardly directed flange of the collar towards the fixed part, and the means for releasably holding the collar in its locked position may include detent means acting between the collar and the base member outer surface. Alternatively, a locking effect can be produced by suitable camming surfaces on the underside of the locking flanges.

The fixed part may be a mounting plate having several apertures each providing a location for a device of this invention.

As indicated, in many cases the fibers need to be rotationally aligned as well as axially aligned, and cannot be allowed to rotate relative to each other. For this purpose the socket portion of the adapter may have a slot for rotationally aligning the ferrule portion of the connector plug, and the outer surface portion and the connector flange may have means for rotationally aligning these flanges.

BRIEF DESCRIPTION OF THE DRAWINGS

A preferred embodiment of the invention will now be described by way of example with reference to the accompanying drawings, in which.

DETAILED DESCRIPTION

Figure 1:
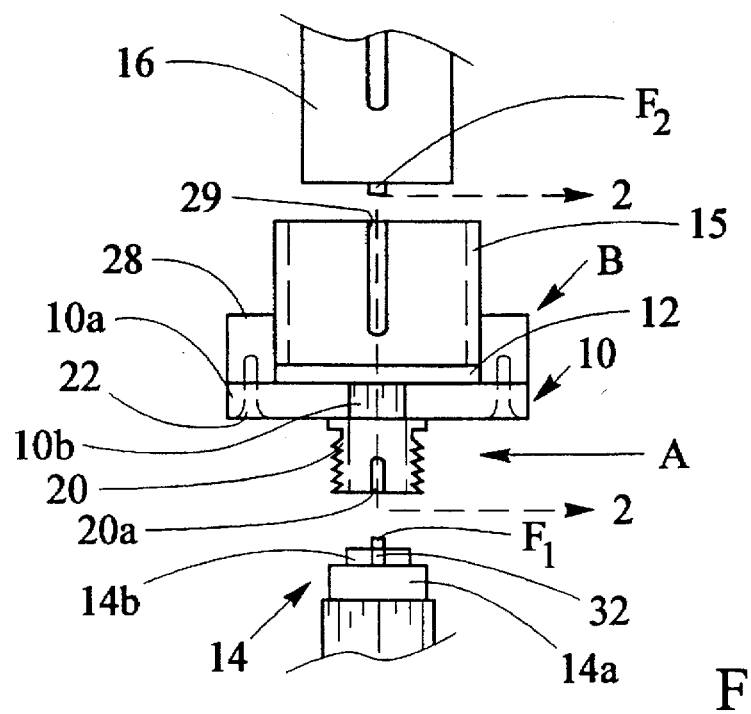
FIG. 1 shows a side elevation of a prior art type of hybrid connector, in this case a FC/SC connector, and shows portions of the plugs used with the different connector parts.
Figure 2:
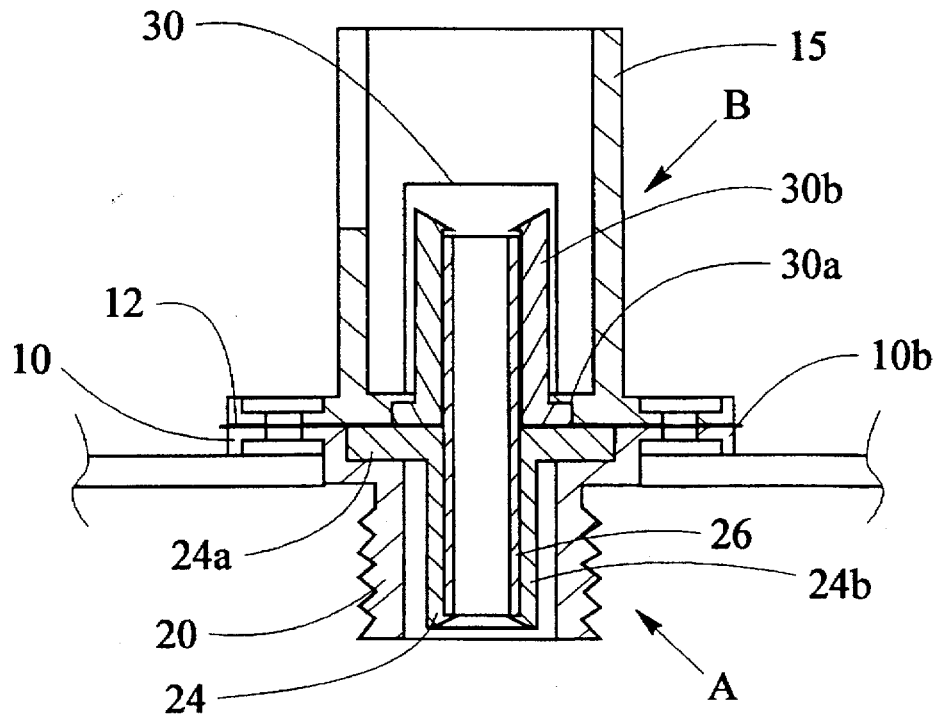
FIG. 2 is a sectional view of the hybrid connector of FIG. 1, on lines 2—2 of FIG. 1, on an enlarged scale.

Referring in more detail to the prior art construction shown in FIGS. 1 and 2, the flanged FC connector socket A has an eternally threaded sleeve 20 which is integrally formed with square sided flange 10. Sleeve 20 has a cylindrical inner surface which accepts the body 14b of the FC connector plug, and also has an alignment slot 20a. The flange 10, when seen in plan view, is in the form of a square with rounded corners 10a and 10b; the section line 2—2 passes through two such corners 10b. All of these corners have bores and recesses which receive screws attaching the halves together. Here the flanges 10 and 12 are held together by screws 22 indicated in FIG. 1 which pass through corners 10a. The flanges may be fixed to plate P.

The part forming the flange 10 and sleeve 20 has an internal recess which receives the flange portion 24a of an insert 24, this insert having a cylindrical portion 24b providing a retainer bushing for an alignment sleeve 26, this being a precision made split sleeve of a type which is common in optical fiber connectors. The sleeve 26 is made of beryllium, copper, or zirconia; other parts so far described are usually of brass or zinc. In some versions of such connectors, the retainer bushing is integral with the flange.

The connector part B has its rectangular receptacle 15 formed integrally with a base which includes the flange 12 and reinforced opposite corners 28 which receive the screws 22. One side of the receptacle has a slot 29 for rotationally aligning the plug 16. These parts of the socket are formed of metal. The socket also includes a molded plastic insert 30 having flange 30a held in a recess in the outer surface of the flange 12 and the housing 15. The insert 30 is a standard component having a central tubular part 30b which receives a part of the alignment sleeve 26 and has opposed side parts 30d which receive and retain the plug 16 as a push fit.

In use, a standard FC connector plug 14 has its nut 14a threaded onto sleeve 20, while internal alignment bushing 14b slides into the cylindrical interior of sleeve 20 and the ferrule F1 enters the alignment sleeve 26. A small rib or pin 32 on alignment engages the slot 20a to ensure correct rotational alignment of the ferrule. At the other end of the connector, the plug 16 is inserted into receptacle 15, with slot 29 ensuring alignment; the plug engages on the insert 30 while the ferrule F2 slides into the adjacent end of the alignment sleeve 26. The sleeve 26 is an interference fit on both ferrules and ensures proper alignment.

It will be seen that this known type of connector will allow an instrument having internal FC connector plugs to be used with external fibers having SC connector plugs. However different external connector plugs could only be used by replacing the part B of the connector with a different connector; this is not practical since screws 22 are factory installed and not suitable for manipulation, and the assembly has many small parts likely to be lost. The present invention by contrast, shown in FIGS. 3-5, allows easy connection to different types of connectors including FC, SC, ST, and many other types of connectors using 2.5 mm ferrules, and other types with different ferrule diameters if appropriate sleeves and housings are made.

Figure 3:
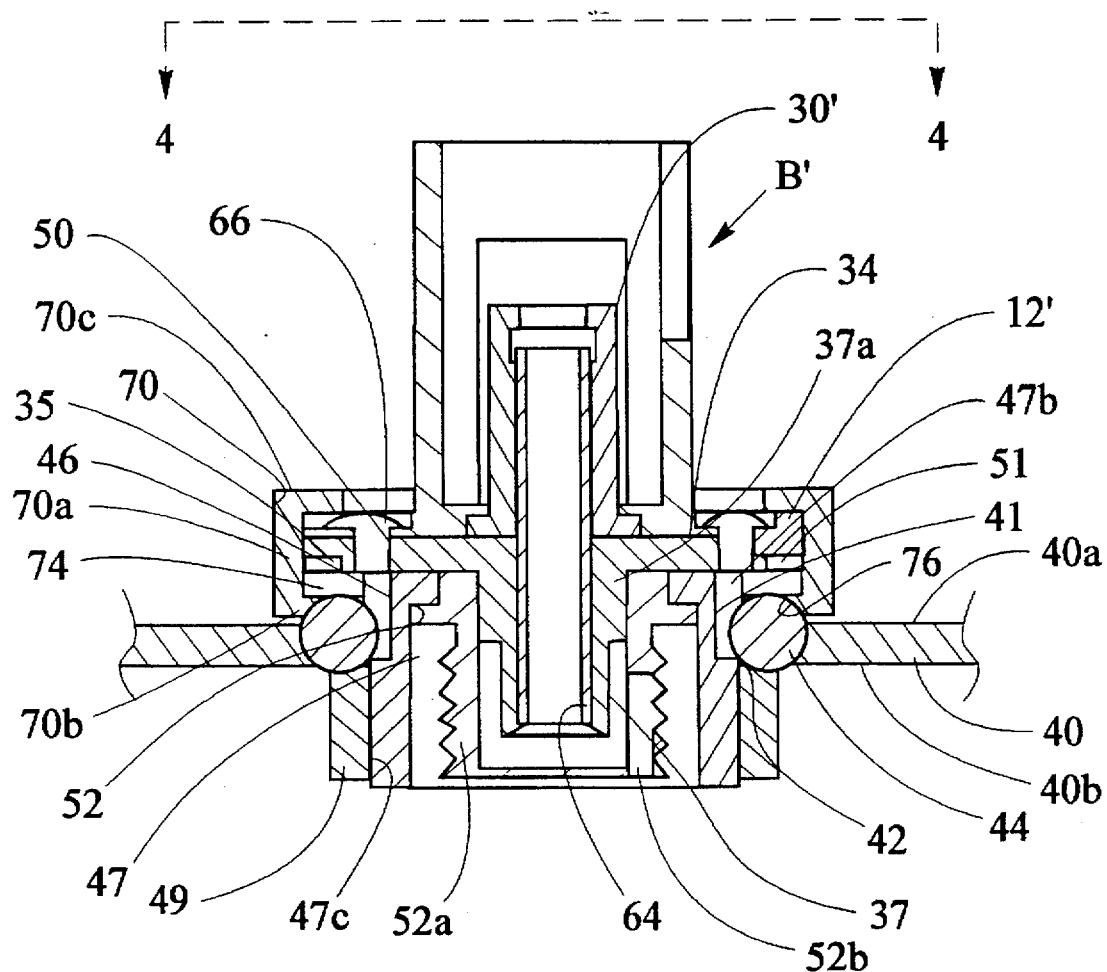
FIG. 3 is a view similar to FIG. 2 of a connector of this invention having a connection receptacle suitable for receiving an external SC type connector plug.
Figure 3A:
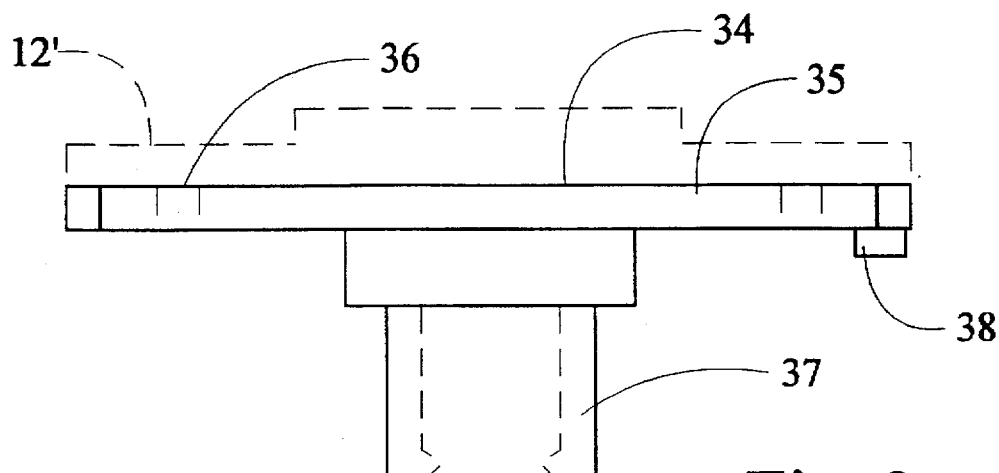
FIG. 3a is a side view of a component which is added to the usual square sided connector flange of a connector socket to suit it to the connector device of this invention.

Referring firstly to FIG. 3a, this shows a side view of a mating plate 34 which is added to a standard square sided flange 12 of a connector socket, to suit it for use with the device of this invention. It comprises a flange 35 having the same size and shape as flange 12, and having threaded bores 36 allowing it to be attached to the flange 12 by small screws, as will be described in detail in connection with FIG. 3. From the flange 35 projects an alignment sleeve retainer bushing 37 having an enlarged upper portion 37a; this is shown in cross-section and further described with reference to FIG. 3. From one corner of flange 35 projects an alignment lug 38.

Referring to FIG. 3, the device of this invention uses a fixed part in the form of a mounting plate 40 having several of these connectors side-by side. This plate 40 may be on the outside of an optical fiber testing instrument which is to be connected to several external fibers, and the mounting plate has an outer surface 40a and an inner surface 40b. Each connector is fitted into a circular aperture 41, and on the two opposite sides of each aperture is a small bore 42, close enough to communicate with the aperture, and which receives a ball bearing 44 having a diameter slightly larger than the thickness of the plate, and which projects slightly into the aperture.

An adapter 46 is held in the aperture 41. This comprises a housing 47 having a substantially flat-topped flange 47a which overlaps with the sides of the aperture and is spaced from the outer side of the plate 40, an intermediate cylindrical portion 47b providing a land which registers on the outer surface of plate 40, and an externally threaded retaining portion 47c projecting from the inner surface of the plate and which receives a retaining nut 49. For alignment purposes, the flange 47a is provided with two oppositely placed bores 50 which cut partly into the cylindrical portions 47b providing slots which locate against the sides of the balls 44, and an aperture 51 cut into one corner. Within housing 47 is fixed an adapter insert 52 which is suited to the internal connector plug; in this case it has an eternally threaded sleeve 52a which is spaced within retaining portion 47c and which, like part 20, has an external screw thread suitable for receiving an FC screw type connector plug and has an inner surface capable of receiving the alignment bushing of the plug. Sleeve 52a also has alignment slot 52b.

The outer part of the connector, which is readily separable from the parts so far described, includes a standard SC connector socket B' having a square sided flange 12', and which is modified by the addition of the mating plate 34 shown in FIG. 3a. The cylindrical portion 37 of the mating plate provides a retainer bushing for an alignment sleeve 64, this being a split sleeve suitable for aligning the optical fiber ferrules, similar to sleeve 26 described above, and having its outer end held by a plastic part 30' similar to part 30 described above. The mating plate flange 35 is held to the flange 12' by screws 66 inserted from the outer sides of flange 12' and which have projecting ends which may, upon assembly, project into the bores 50 in the adapter flanges. In addition, the alignment lug 38 projects into aperture 51; these features ensure correct rotational alignment of the parts. The enlarged portion 37a of retainer bushing 37 fits closely within insert 52 to ensure alignment.

The flanges 47a and 35 are releasably secured together by a retaining collar 70 having an outer cylindrical wall 70a, an inwardly directed annular flange 70b at the inner end of the wall, and outer flange portions 70c at the outer end of the wall. The inner annular flange 70b is trapped between the outer surface of plate 40 and the periphery of flange 47a, and a compression spring 74, in the form of a non-flat washer which is held between the flange 47a and collar flange 70b, urges the collar towards the plate 40. The underside of this flange 70b has dimples 76 which, in a predetermined rotational position of the collar, engage on the balls 44 which thus provide detents to yieldingly retain the collar in the locked position shown. The external surface of the collar may be knurled to make it easy to grasp for mining.

Figure 4:
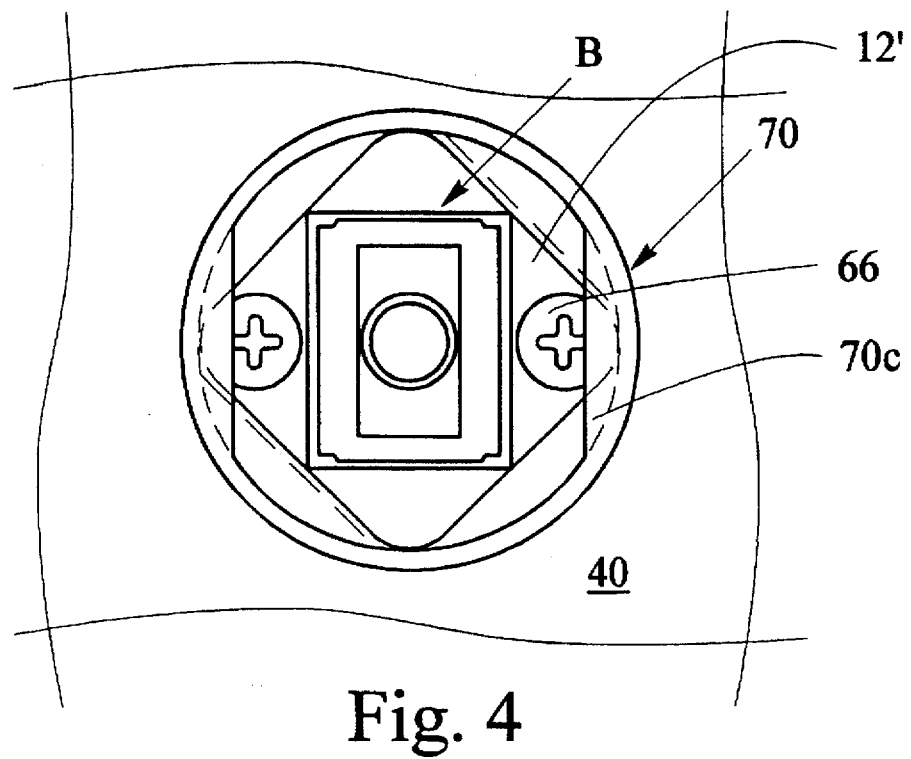
FIG. 4 is a plan view on lines 4—4 of FIG. 3.
Figure 5:
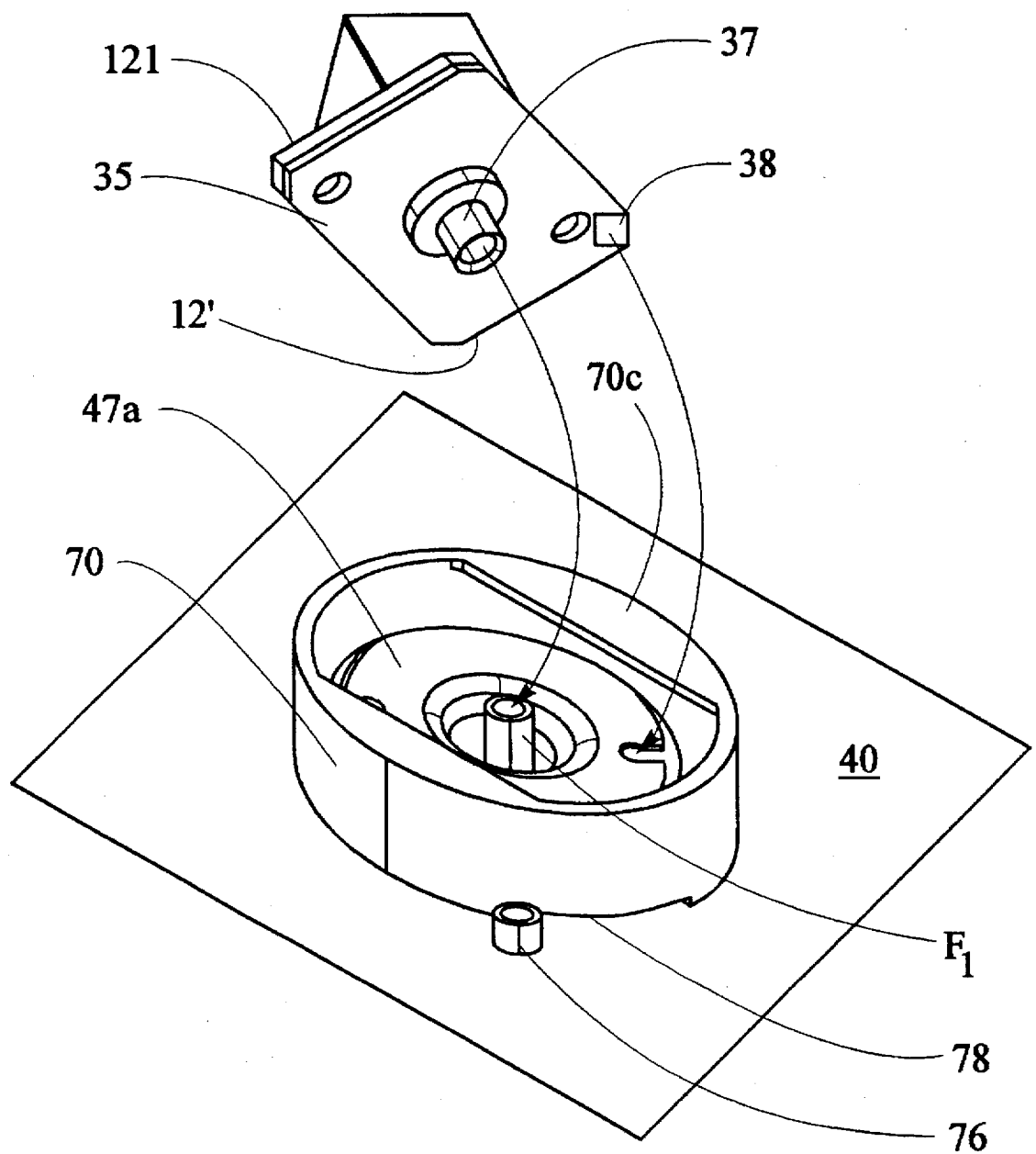
FIG. 5 is a perspective view of the two connector parts shown in FIG. 3 in the process of being connected together.

The nature of the outer flange portions 70c of the collar, in relation to the flanges 12' and 35, is shown in FIGS. 4 and 5. It will be seen that the flange portions 70c define a non-circular opening into the collar, through which can pass the sides of the flanges 12' and 35 when suitably aligned, as indicated in broken lines. Rotation of the collar through 45E from this aligned position, into the position shown in full lines, locks the flanges 12' and 35 to the adapter flange 47a, and therefore locks the connector B' in position. FIG. 5 shows a small cap screw 76 in plate 40, which engages a recess 78 in ting 70 to limit its rotation to 45E.

Figure 6:
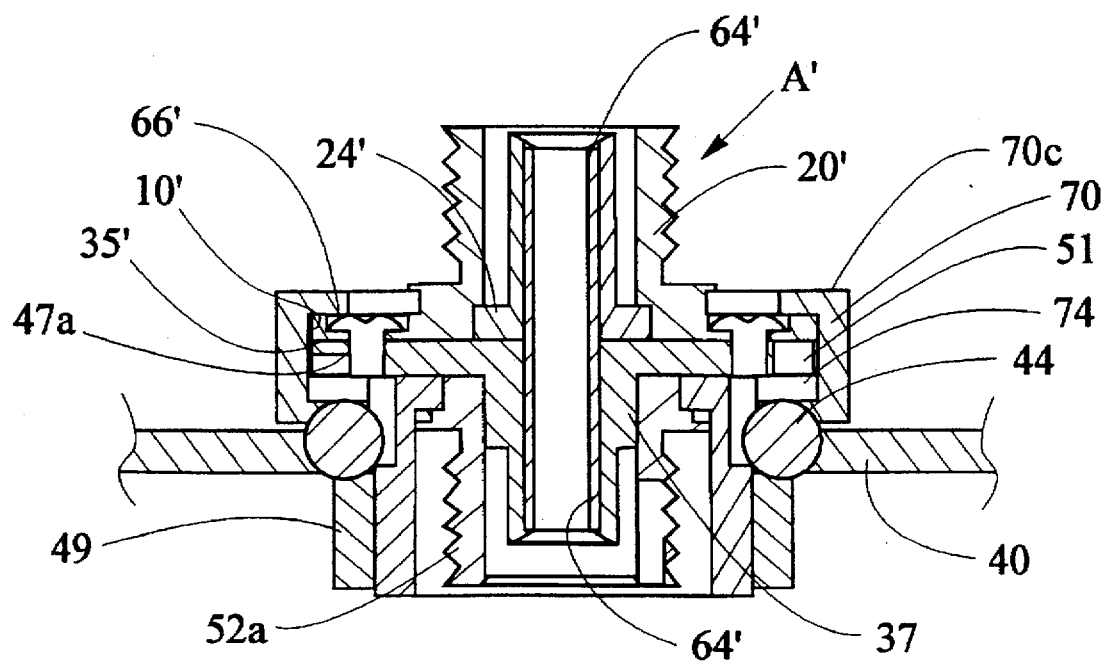
FIG. 6 is a view similar to FIG. 3 of the same connector device but having a connector socket suitable for receiving an external FC type connector plug.

FIG. 6 shows the device of this invention being used with an external FC type connector socket A', similar to socket A, and having a flange 10' integral with a threaded sleeve 20', and holding an insert 24', all these parts being similar to parts 10, 20, and 24 previously described. As in the FIG. 3 construction, the flange 10' is held by screws 66' to a mating plate flange 35', which is identical to the flange 35 shown in FIGS. 3 and 3a, and which provides an alignment sleeve retainer bushing for one end of the alignment sleeve 64', the other end of which is held by insert 24'. The parts have the same rotational alignment means as previously described. As before, the combined flanges 10' and 35' can be fitted into the opening into collar 70 when their sides are aligned with flange portions 70c, and the flanges can be locked in position by taming the collar through 45E, in which position the balls 44 enter the dimples in the underside of the collar and tend to retain this collar in this locked position.

It can thus be seen that the connector device of this invention allows an internal fiber to be selectively connected to external connector plugs of many different types through the intermediary of a flanged socket together with the kind of mating plate shown in FIG. 3a. Also, the basic structure is suitable for various different kinds of internal connector plugs, depending on the nature of the adapter insert 52. The device can be made from relatively inexpensive parts, and is short and not much subject to damage. When the flanged parts are removed, the internal ferrule can be inspected and cleaned.

What we claim is:

1. A device for connecting a first optical fiber end held by a first connector plug selectively to second or third optical fiber ends held by different types of connector plugs, each said different types of plug having an associated connector socket, said sockets each including a non-circular connector flange and each having a ferrule alignment sleeve held by a retainer bushing projecting outwardly from the connector flange, the alignment sleeves being suitable for receiving cylindrical ferrules attached to each fiber end, comprising:

a fixed part having an aperture extending between its inner and outer surfaces, and having a connector adapter projecting from said inner surface and suitable for receiving the first connector plug, and having a radially extending outer surface portion accessible from said outer surface and surrounding a recess suitable for receiving the retainer bushing, retaining means rotatably mounted on the fixed pan co-axially with the adapter and having opposed flange portions spaced from the outer surface portion, which flange portions define a non-circular opening such that opposite sides of one of the non-circular connector flanges can pass between said flange portions when aligned therewith to bring said alignment sleeve retainer bushing into the adapter recess, and such that opposite corners of the connector flange can be retained by said flange portions upon rotation of the retaining means into a locked position with the connector flange being held against the radially extending outer surface portion; and means tending to hold the retaining means in said locked position relative to said base member, whereby any of said connector sockets can be connected to the device by inserting its connector flange through said non-circular opening and causing relative rotation between the retaining means and the fixed part through a predetermined angle to secure the flange to the adapter.

2. A device according to claim 1, wherein said adapter has a flange which overlaps the sides of the aperture on the outer side of the fixed part and which provides a flat surface portion for receiving the connector flange, and wherein said retaining means is a collar having a cylindrical wall with an inwardly directed flange at an inner end of said wall which is trapped between the base member outer surface and said flange of the adapter.

3. A device according to claim 2, further comprising spring means urging said the inwardly directed flange of the collar towards the base member, and wherein said means for releasably holding the collar in said locked position includes detent means acting between the collar and the base member outer surface.

4. A device according to claim 1, wherein the radially extending outer surface portion of the adapter has means for aligning the connector flange when mated therewith.

5. A device for connecting a first optical fiber end held by a first connector plug selectively to second or third optical fiber ends held by different types of connector plugs, each said different types of plug having an associated connector socket, said sockets each including a square sided connector flange and each having a ferrule alignment sleeve held by a retainer bushing projecting outwardly from the connector flange, the alignment sleeves being suitable for receiving cylindrical ferrules attached to each fiber end, comprising:

a fixed part having an aperture extending between inner and outer surfaces, a connector adapter having a main body part projecting through said aperture and having a flange surrounding said aperture on said outer surface, said main body part having means suitable for receiving said first connector plug, a collar rotatably mounted on the outer surface of said base member co-axially with the adapter, said collar having an outer cylindrical wall with an inwardly directed flange at its inner end which flange is trapped between said outer surface and said flange of the adapter, said collar having diametrically opposed retaining flanges projecting inwardly from an outer end of the collar wall remote from the fixed part and which define a non-circular opening into said outer end, said opening being such that the sides of each of said square sided connecting flanges can pass between said flange portions when opposed sides of the said connecting flange are aligned with said flange portions, and such that the corners of said connecting flange can be held by said retaining flanges when the collar has been rotated into a predetermined locking position relative to the base portion, compression spring means held between said flange of the adapter and said inwardly directed flange of the collar and urging said inwardly directed flange of the collar towards said outer surface of the base member, said spring means cooperating with detent means acting between the said outer surface and said inwardly directed flange to yieldingly retain the collar in said predetermined locking position relative to the base member, said adapter flange providing a flat surface portion for receiving said connector flange, both said connector flange and said adapter flange having registration means for holding these parts in predetermined rotational relationship, whereby each connector socket can be secured to the device by inserting its square sided mounting flange through said non-circular opening and causing relative rotation between the collar and the connector flange so that said retaining flanges of the collar secure the flange in the collar.

6. A device according to claim 5, wherein one of said connector sockets has a rectangular receptacle for receipt of a rectangularly shaped plug.

7. A device according to claim 5, wherein one of said connector sockets has an externally screw threaded sleeve for receipt of a screw threaded type connector.

8. A device according to claim 5, wherein one of said connector sockets is suited to a bayonet type connector plug.

* * * * *